United States Patent [19]
Einkauf et al.

[11] Patent Number: 5,283,860
[45] Date of Patent: Feb. 1, 1994

[54] SYSTEM AND METHOD FOR DISPLAYING TRIMMED SURFACES USING BITPLANE MASKING

[75] Inventors: Mark A. Einkauf, Leander, Tex.; Jaroslaw R. Rossignac, Ossining, N.Y.; Michael T. Vanover, Austin, Tex.; Jeffrey Wu, New York, N.Y.

[73] Assignee: International Business Machines Corporation, Armonk, N.Y.

[21] Appl. No.: 614,352

[22] Filed: Nov. 15, 1990

[51] Int. Cl.⁵ .............................................. G06F 15/72
[52] U.S. Cl. .................................... 395/134; 395/142
[58] Field of Search ............... 395/118, 119, 123, 134, 395/141, 142, 143; 340/747, 750

[56] References Cited

U.S. PATENT DOCUMENTS

| | | | |
|---|---|---|---|
| 3,816,726 | 4/1974 | Sutherland et al. | 235/152 |
| 4,625,289 | 11/1986 | Rockwood | 364/522 |
| 4,821,214 | 4/1989 | Sederberg | 364/522 |
| 4,835,712 | 5/1989 | Drebin et al. | 364/518 |
| 4,855,934 | 8/1989 | Robinson | 364/521 |
| 4,888,712 | 12/1989 | Barkans et al. | 364/522 |
| 4,912,659 | 3/1990 | Liang | 364/521 |
| 4,914,607 | 4/1990 | Takanashi et al. | 346/521 |
| 4,930,092 | 5/1990 | Reilly | 364/522 |
| 4,992,962 | 2/1991 | Ishida et al. | 364/522 |

FOREIGN PATENT DOCUMENTS 0277832 10/1988 European Pat. Off. .
0176373 3/1989 Japan .

OTHER PUBLICATIONS

IBM Technical Disclosure Bulletin, "High Performance Graphics Character Drawing Algorithm," vol. 31, No. 9, Feb. 1989, pp. 131–135.

Computer Graphics "Real-Time Rendering of Trimmed Surfaces," A. Rockwood, K. Heaton, T. Davis, vol. 23, No. 3, Jul. 1989, pp. 107–116.

"The Graphical Processing of B-Splines in a Highly Dynamic Environment," Abi Ezzi, Salim Samir, PHD Thesis Rensselaer Polytechnic Institute, 1989, pp. 172–181.

Primary Examiner—Phu K. Nguyen
Attorney, Agent, or Firm—Mark E. McBurney

[57] ABSTRACT

A system and method is provided for displaying trimmed surfaces on a computer graphics system. The present invention tessellates a three-dimensional surface into triangles and determines whether a trimming curve intersects any triangles. If an intersection occurs, a polygon trimming mask is formed by performing an exclusive OR operation and rendering the polygon into a mask plane. The XOR operation sets the bits in the mask plane corresponding to the trimming mask to logical 1. The rendering hardware then compares the bits in the mask plane with the bits in the frame buffer and draws those pixels which correspond to the bits set to 1 in the mask plane. Since, the trimming mask is a polygon the rendering hardware can perform shading, or lighting calculations using values for points which are contained on the tessellated triangle. In this manner, consistent lighting of a trimmed surface can be achieved. Additionally, the present invention provides for the formation of multiple trimming masks when multiple trimming curves intersect a tessellated triangle. The multiple trimming masks are sequentially XORed into the mask plane and the corresponding pixels are then drawn.

18 Claims, 6 Drawing Sheets

SYSTEM AND METHOD FOR DISPLAYING TRIMMED SURFACES USING BITPLANE MASKING

BACKGROUND OF THE INVENTION

This invention generally relates to the display of parametric surfaces in a computer graphics system. In particular, a trimming operation is implemented wherein a portion of a surface, displayed on a computer graphics system, is subtracted. For example, a scene being displayed may include a sphere, a cylinder, a planar surface and the intersection therebetween. It may be desired to subtract the sphere (or a portion of the sphere) from the scene, such that a shadow, shaded area, or the like may be displayed in place of the sphere.

Generally, non-trimmed parametric surfaces may be rendered on graphics hardware by computing and shading a tessellation area (generally a triangulation) covering the entire surface to be displayed. It should be noted that a triangulated surface shall be used herein to describe any area to be rendered on the display of the computer graphics system. Trimmed surfaces are limited by the intersection of trimming curves therewith, which function to subtract an area, or portion of the surface, for reasons discussed above.

Figure 3:
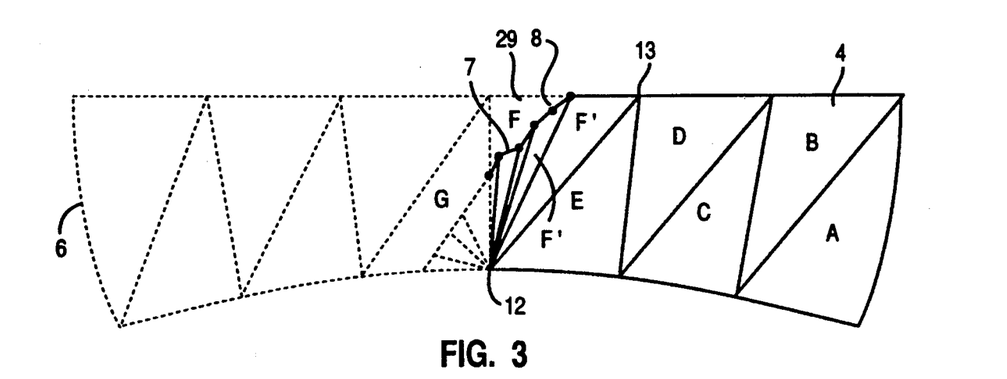
FIG. 3 shows a strip within a patch having tessellated triangles, and triangulation of an individual tessellated triangle intersected by a trimming curve.

Traditional methods for rendering trimmed surfaces include modifying the tessellation of a surface by introducing surface points along the trimming curves at the point(s) of intersection of the border of the original tessellation triangle. Prior art systems then must compute coordinates, normals and reflected light intensities for each of these additional points. Additionally, since the majority of graphics processing systems are optimized for triangles, the relevant portions of the tessellation triangles, near the trimming curve, must be triangulated (FIG. 3). The introduction of these new points results in shading inconsistencies between points on the trimmed surface and the same points on the original non-trimmed surface. Further, processing time is increased for the trimmed surfaces since the coordinates, normals, light intensities and triangulation must occur.

Other conventional systems include using the software of the graphics system to perform trimming, prior to sending the device coordinates to the display hardware, which is a complex and slow solution, that requires a large amount of program memory.

European Patent 0 277 832 performs trimming by using a graphics accelerator which determines where straight line approximating segments of the trimming curves cross subspan boundaries of the tessellated area and changes the vertices of the subspans to trim away portions of the polygon. A data structure is built linking lists of vertex tables that represent the untrimmed polygon and any trimming curves which intersect the polygon.

U.S. Pat. No. 4,914,607 describes a multi-window environment in which the data to be displayed undergoes an exclusive OR operation, bit by bit, with the bit-map data developed in a logical plane.

It can be seen that conventional trimming systems are extremely complex and require a great deal of computing time and overhead. Therefore, it is desirable to have a computer graphics system which is capable of performing a trimming operation that overcomes the drawbacks of prior art systems. In particular a trimming system is desired which: (1) does not require lighting calculations for additional vertices (points) along the trimming curve; (2) avoids triangulation of portions of tessellated triangles near the trimming curve; and (3) provides consistent shading between trimmed and non-trimmed surfaces, i.e. the colors resulting from lighting calculations on a trimmed surface should be identical to the colors resulting from lighting calculations on an identical surface which is not trimmed, for all areas common to both rendered surfaces.

SUMMARY OF THE INVENTION

In contrast to the prior art, the present invention presents a means of overcoming the previously discussed limitations. The present invention renders trimmed tessellation triangles in their original form using only the lighting information of the original triangle vertices, thus preserving image consistency. Trimming is implemented by masking the projection of the trimmed portions of the tessellated surface prior to rendering of the surface by the computer graphics system. The masking function is achieved for each trimmed portion of the original tessellated surface, by using a bit plane and an exclusive OR (XOR) operation.

The present invention uses a vertex of the original tessellation and all the edges of the trimming curves to render tessellated surfaces into the mask by using an exclusive OR update condition. Once the edges of the trimming curve are processed, the mask is set for the portions of the surface that are not trimmed away. The mask is checked during the display of the untrimmed triangle and only masked pixels are effected.

The present invention includes several advantages when compared to conventional software trimming methods. For example, it renders trimmed surfaces without the necessity of calculating lighting effects for vertices introduced by trimming curves. Therefore, significant reductions in computation time are achieved. Also, program memory requirements are reduced since trimming operations having multiple trimming curves is simplified. Trim surfaces rendered by utilizing the present invention creates surfaces for display with lighting affects which are more accurate than conventional systems. The algorithm utilized in the microcode does not require that the trimming curve be oriented in a specific clockwise or counter clockwise direction, and allows trimming curves to contain shared vertices.

In accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
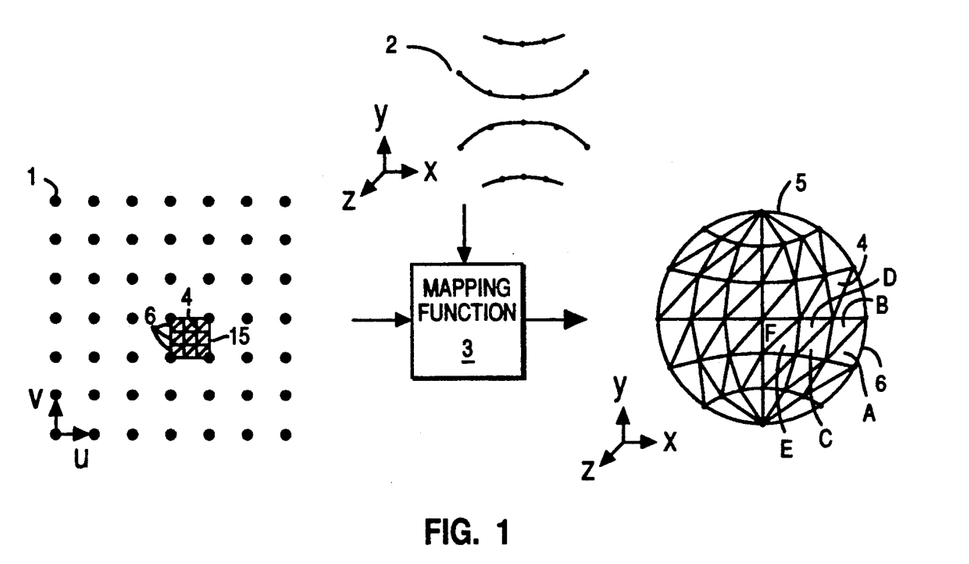
FIG. 1 is a functional diagram showing the mapping of three-dimensional control points with a knot grid (two-dimensional parametric points) to yield a three-dimensional parametric surface.

Referring to FIG. 1, a mapping function is shown which allows complex surfaces to be displayed in the form of parametric surfaces. Recently, computer graphics systems began offering parametric surfaces as a means of describing complex surfaces which may be concave and/or self intersecting. One advantage of utilizing parametric surfaces is that a relatively low number of "knots" 1 and their associated control points 2 are needed to define a complex surface. The control points 2 are defined in cartesian coordinates (x, y, z) and describe the general shape of the surface, i.e. A mapping function 3 processes the control points and knots to produce a set of points which lie on the actual surface being rendered on a display. Generally, the mapping function 3 is used to tessellate the mapped area. It should be noted that the majority of computer graphics systems tessellate this area into triangles, as noted by reference number 4 in FIG. 1. However, the tessellation process may yield any object, including surface points (e.g. pixels), which can be shaded one by one, or lighted by the graphics hardware. Shading and lighting refer to determining the intensity, color values and the like of pixels to be drawn on a display and these terms will be used interchangeably herein. It should be noted that the present invention will be described with reference to tessellated triangles, however, any tessellated surface capable of processing by computer graphics shading hardware is contemplated by the present invention. As known in the art, the graphics display hardware processes the tessellated mesh (e.g. a triangular mesh) and performs transformation lighting, clipping, perspective projection, mapping to device coordinates and rendering by special hardware which Gouraud shades each triangle in a mesh. It should be noted that Gouraud shading is a means of performing color interpolation for pixels interior to a tessellated triangle, based upon the color values for the vertices of the triangle. Gouraud shading is referred to herein as an example of color interpolation, not as a limitation, and other means of color interpolating tessellated surfaces are contemplated by the present invention. The previously described steps of displaying the surface as tessellated triangles is referred to as a "graphics pipeline." For the purposes of describing the present invention, it will be assumed that a sphere 5, as shown in FIG. 1, is the surface to be trimmed. Additionally, referring to FIG. 1, a representative area (referred to herein as patch 15) between four of the knots 1 is shown and tessellated into quadrilateral areas 6 (referred to herein as strips), which are further tessellated into triangles 4. This two-dimensional tessellated area is then mapped into a tessellation of a sphere surface 5, as shown in FIG. 1.

As previously discussed, it may be desirable to trim a portion of a surface being rendered in order to enhance a scene being displayed. The present invention will further be described with reference to FIG. 2 which illustrates sphere 5 having a trimmed surface portion removed therefrom. It can be seen that a representative quadrilateral (strip) 6 has been taken from sphere 5 and will be used to describe the present invention. Strip 6 includes a plurality of tessellated triangles 4 which are further represented as triangles A, B, C, D, E and F. A trimming curve 7 is shown which is defined by plurality of vertices 8. Trimming curve 7 forms the intersection between the portion of sphere 5 which is to be displayed and that portion which is to be trimmed away.

Figure 2:
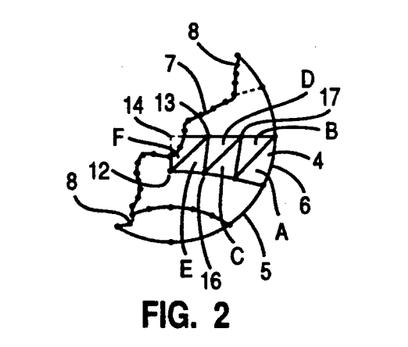
FIG. 2 illustrates a trimming curve and its intersection with a surface being displayed, which is comprised of four-sided three-dimensional patches.

Parametric curves are utilized to trim parametric surfaces such that the parametric space in which the surface knots are defined is trimmed by one or more curves. In this manner, the equation for the trimming curve can be used to put holes into a surface or to describe a complex surface boundary. As seen in FIG. 2, the portions of the triangular mesh which do not lie near the trimming curve 7 can be rendered as a normal triangular mesh, i.e. triangles A-E that are not intersected by trimming curve 7. However, that portion of the triangular mesh that is intersected by trimming curve 7 must be modified so that the resulting rendered surface appears trimmed, i.e. triangle F of FIG. 2 must be trimmed. Further, those triangles which are wholly included in the portion of the surface to be trimmed away can be discarded, or ignored by the present invention and do not undergo any further processing.

FIG. 3 is an expanded view of strip 6 as contained in sphere 5 of FIG. 2. It can be seen that triangles A-E are included and are not intersected by trimming curve 7. However, triangle F is also shown in FIG. 3 and is intersected by trimming curve 7. It can be seen from FIG. 3 how a conventional system would use software to triangulate triangle F into a plurality of subtriangles F' which can then be handled by the graphics pipeline, thereby resulting in additional processing time since more vertices must be inserted into a surface mesh, e.g. values for the vertices 8 along trimming curve 7 must be calculated. Additionally, conventional trimming systems require the time consuming step of lighting each of the subtriangles F' contained within triangle F. This lighting is accomplished by taking the normal at the original vertices of triangle F, performing linear interpolation of the normals and performing lighting calculations for each vertex of each of the subtriangles F'. It can be seen that a great deal of time and overhead is required to calculate the color for each subtriangle contained in each of the tessellated triangles 4 which intersect trimming curve 7 (see FIGS. 1 and 2). Therefore, elimination of these lighting calculations will decrease processing time, thereby greatly increasing efficiency.

The present invention avoids the necessity of having to perform lighting, or shading calculations for each of the vertices 8 included in trimming curve 7. This task is accomplished by rendering without shading calculations, the additional vertices 8, introduced due to trimming curve 7, and one or two vertices of the original tessellation triangle 7, as a polygon into a 1-bit per pixel bit plane (mask plane 20, FIG. 8), with an exclusive OR (XOR) operation. The 3-D coordinates of the vertices 8 of trimming curve 7 may be computed by evaluating the surface at corresponding parameter values or by using their relative location within the tessellation triangle. This polygon, which has been rendered into the mask plane, constitutes a "trimming mask" and it is not required to calculate any color information for lighting purposes for the vertices 8 which are now stored in the mask plane 20.

Figure 4:
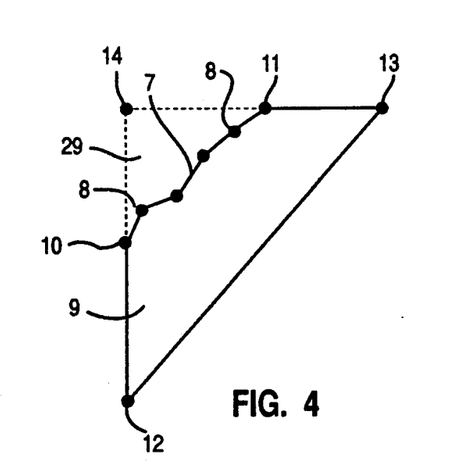
FIG. 4 is a tessellated triangle with a portion trimmed away.

FIG. 4 shows a polygon 9 which constitutes a trimming mask. It can be seen that mask 9 is equivalent to triangle F of FIG. 3, with the portion to be trimmed (region 29) deleted. Insertion points (vertices) 10,11 are calculated by interpolation methods and original triangle F is then modified by insertion of vertices 10 and 11 at points where trimming curve 7 intersects the original triangle edges. Thus, original triangle F has become a polygon F" (which is equivalent to triangle with insertion vertices 10,11). Hereinafter, the original tessellation triangle (which may be any object depending upon the type of graphics hardware) will be referred to as triangle F, whereas polygon F" refers to the polygon corresponding to triangle F and insertion points 10,11, mask 9 refers to the trimming mask and polygon F''' refers to the trimmed triangle F to be displayed. Mask 9 is of a configuration that can be processed by rendering.

Figure 8:
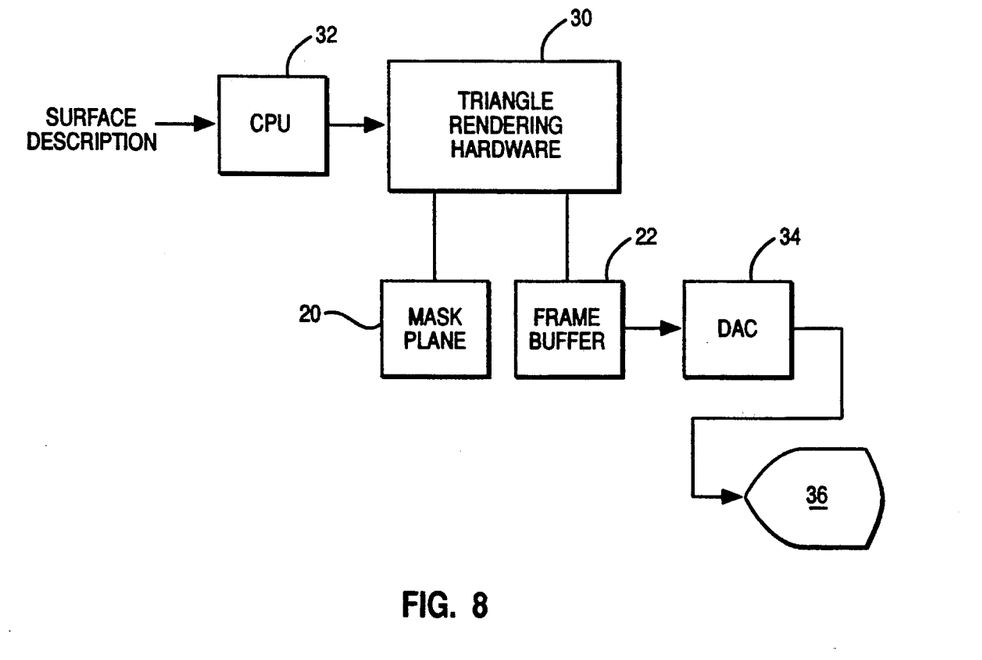
FIG. 8 is a block diagram of the hardware which may be utilized by the present invention to display trimmed surfaces.

Thus, lighting calculations are only required for the original vertices of the triangle. The rendering hardware then processes triangle F as a lighted, non-trimmed triangle.hardware capable of displaying complex surfaces. Alternatively, for ensuring 3-D coordinate consistency the present invention performs lighting calculations required for the original vertices of the triangle with the colors for insertion vertices 10, 11 being computed through linear interpolation from the colors of the original vertices of triangle F. Thus, the colors of insertion vertices 10, 11 are the same as if no trimming had occurred. The rendering hardware then processes polygon F" as a lighted, non-trimmed polygon consisting of a sequence of shaded triangles. Since the lighting values of the five vertices of polygon F" (pixels 10–14, FIG. 5) are known, polygon F" may now be rendered by rendering hardware 30 (FIG. 8). The type of triangulation required by the present invention is implemented in the rendering hardware and is trivial when compared to that as shown in FIG. 3. Standard Gouraud shading techniques, or the like are then used by the hardware to interpolate colors for each triangle within mask 9.

In order to create the trimming mask polygon 9, an exclusive OR update of the mask plane is performed with the vertices of mask polygon 9. In this manner, only those bits in the mask plane 20 corresponding to the interior of the mask 9 are turned "on" (set to logical 1). The remaining bits of the mask plane stay at logical 0, since the entire bit plane was previously reset (all bits set to logical 0). In addition to performing color interpolation, the triangle rendering hardware also compares, or checks each pixel of the polygon F" in the trimming mask and determines if the bits set to logical 1 (mask 9) in prior to rendering the pixel into the frame buffer. Further, the pixel in the display frame buffer is not updated unless the corresponding bits in the mask plane are set to logical 1.

Figure 7:
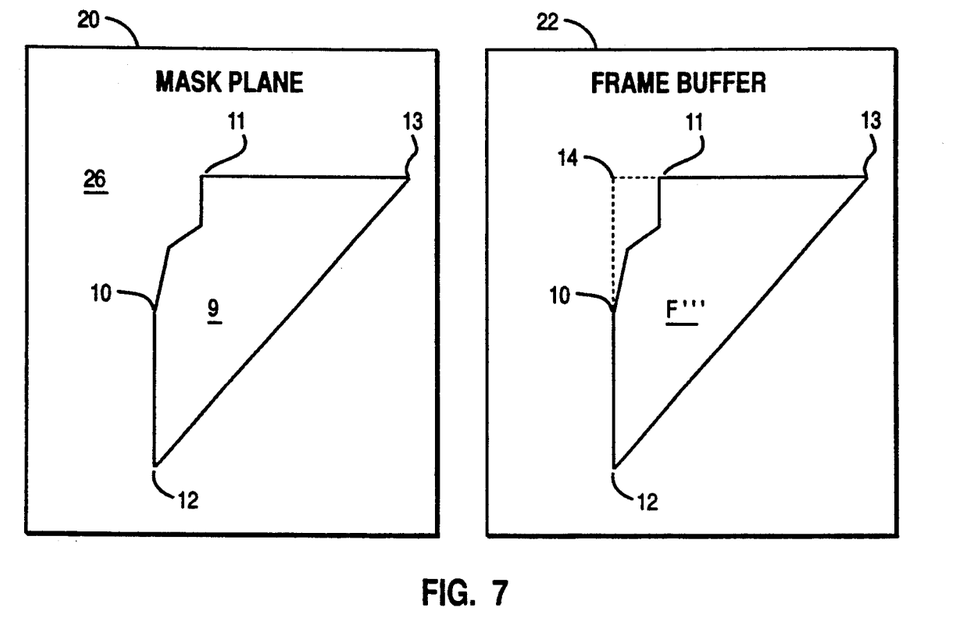
FIG. 7 is a block diagram showing the comparison function of the present invention wherein the mask is compared with the original tessellation triangle such that the trimmed triangle can be rendered.

Referring to FIG. 7, an example of the comparison which occurs between the mask plane and the original triangle will be described. Mask plane 20, previously discussed, is a 1-bit plane, each bit corresponding to a pixel on a display. Therefore, $M \times N$ bits are present, with M and N corresponding to as few as 400 and as many as 1024 pixels. Thus, there is a one to one correlation between the bits in mask plane 20, the frame buffer 22 (see FIG. 7) and the pixels on display 36. For example, those bits corresponding to pixels within trimming mask polygon 9 are turned on i.e. set to logical 1, due to the XOR operation which rendered the mask into the bit plane 20. All remaining bits of mask plane 20, as noted by reference 26 remain off, i.e. set at logical 0. The rendering hardware 30 (FIG. 8) then compares each pixel associated with the polygon to be drawn (polygon F") and each bit of mask plane 20, associated with trimming mask 9. Each pixel associated with polygon F" that corresponds to a bit set to logical 1 in trimming mask 9 is rendered into the frame buffer, and thereby appears on display 36 (FIG. 8). In this manner, only those pixels having a direct correlation to trimming mask 9 of mask plane 20 are rendered onto display 36. Once each pixel corresponding to trimming mask 9 is drawn then each bit of mask plane 20 corresponding to trimming mask 9 is reset (set to logical 0).

Figure 5:
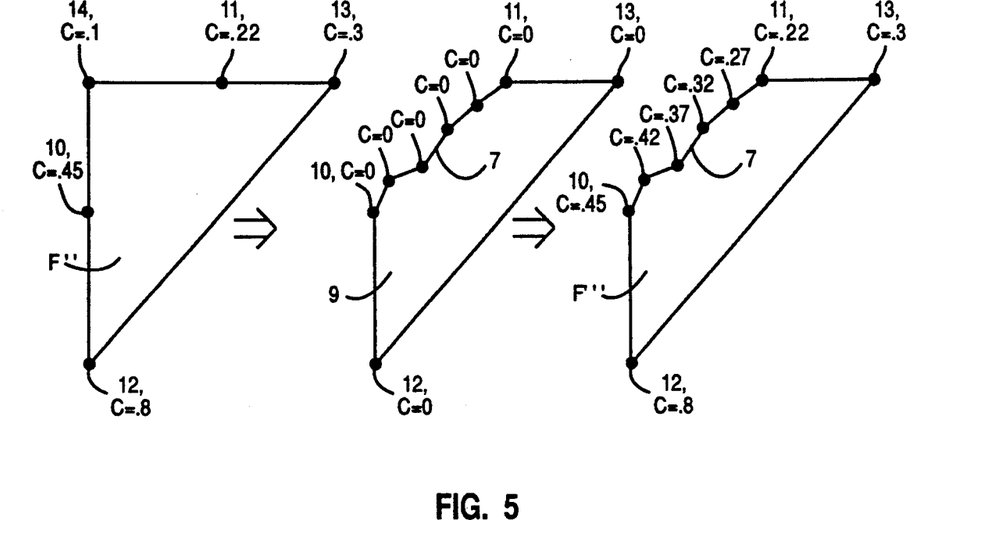
FIG. 5 illustrates the masking and lighting functions of the present invention.

FIG. 5 shows polygon F" which has vertices 12, 13, 14 (corresponding to triangle F) each having color values of 0.8, 0.3, 0.1, respectively. Additionally, insertion vertices 10 and 11 are shown with interpolated color values of 0.45 and 0.22, respectively. As described above a trimming mask 9 is then rendered into mask plane 20 with an exclusive OR operation. Mask plane 20 is a single bit plane and is incapable of storing color information. Rendering hardware 30 then performs Gouraud shading on polygon F". Therefore, polygon F''' is displayed which has colors based upon the original colors of triangle F, as interpolated by standard shading techniques. Polygon F''' represents the surface corresponding to trimming mask, but which includes the additional lighting (color) information needed to actually display a trimmed surface. Thus, it can be seen from FIG. 5 how the transformation from an originally tessellated triangle F (FIG. 4) into polygon F" (triangle F plus insertions vertices 10,11), trimming mask 9 and further into a fully rendered, colored and displayed polygon F''' occurs by implementation of the present invention.

Another embodiment of the present invention simplifies trimming operations when multiple trimming curves are present and intersect a single tessellated triangle. The present invention provides for multiple masks produced by multiple trimming curves to be rendered into mask plane 20 using an exclusive OR mode so that the resulting mask has the desired trimming effect. The present invention eliminates the need, inherent in traditional trimming methods, which requires a complex software algorithm to manage and keep track of all introduced vertices that are intersections of the trimming curves in order to conventionally triangulate triangle F, as shown in FIG. 3.

Figure 6:
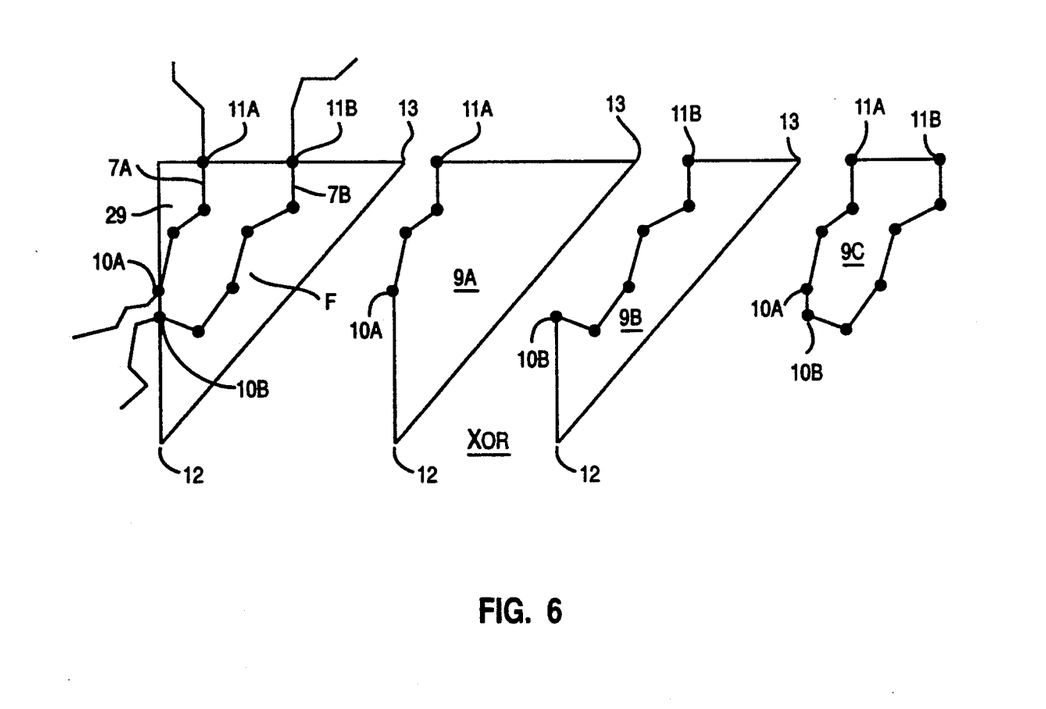
FIG. 6 illustrates a feature of the present invention which deletes a portion of a tessellated triangle that does not lie between two trimming curves.

Referring to FIG. 6, tessellated triangle F is shown, and intersects with trimming curves 7A and 7B, which intersect triangle F at points 10A, 11A, 10B and 11B. In a manner as previously described, trimming mask 9A is obtained in the same way as the mask polygon 9 shown in FIGS. 4 and 5. The present invention then obtains an additional trimming mask 9B which is that portion of original triangle F less the region to be trimmed on the opposite side of trimming curve 7A from the hypotenuse of triangle F. An exclusive OR operation is then performed between the bits of trimming mask 9A and trimming mask 9B. The results of this exclusive OR operation is a third trimming mask 9C which is a polygon having vertices 10A, 10B, 11A, 11B all of which intersect an edge of original triangle F. Therefore, it can be seen how an exclusive OR operation between two, or more trimming masks will render an additional trimming mask into mask plane 20 such that an interior portion of a tessellated triangle may be trimmed. For convenience, the previous example uses the case where two trimming curves intersect a tessellated triangle, however any number of intersecting trimming curves may be processed by the system and method of the present invention, as will be described in conjunction with the flowchart of FIGS. 10A and 10B.

Figure 9:
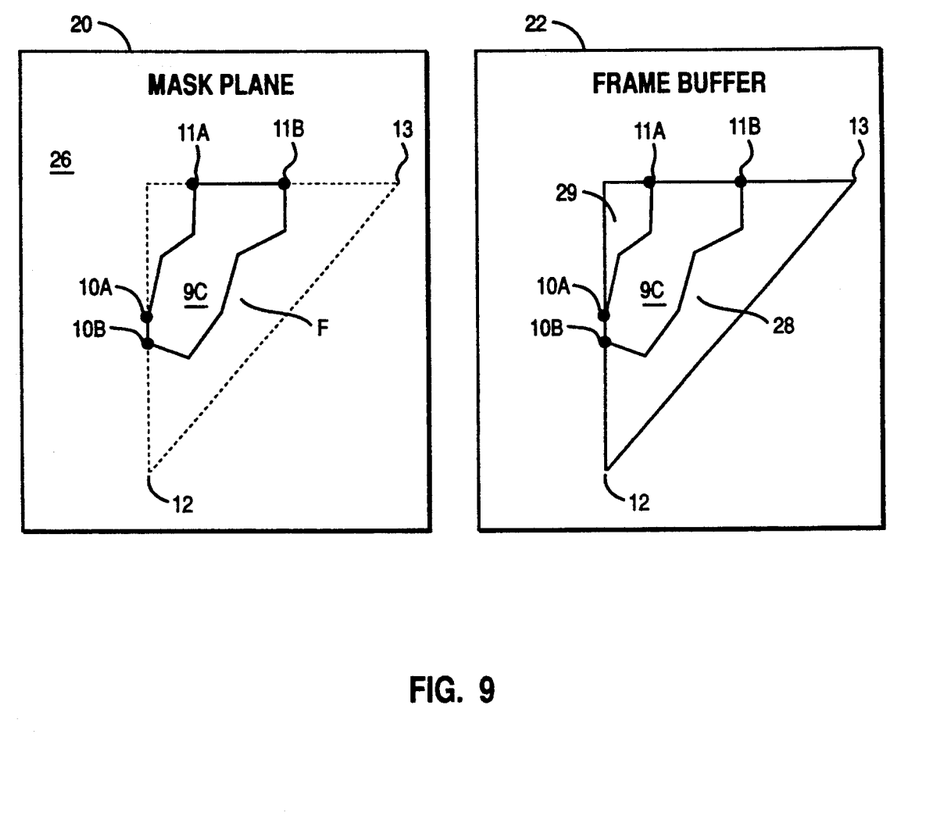
FIG. 9 is a block diagram showing the comparison of a mask with an original tessellation triangle which occurs prior to rendering.

FIG. 9 illustrates the comparison which occurs between the mask 9C within mask plane 20 and triangle F which is similar to the comparison described with reference to FIG. 7. That is, the rendering hardware compares the pixels of triangle F with the bits rendered into mask plane 20, i.e. those corresponding to mask 9C. Since, the bits associated with mask 9C have been set to logical 1, due to the XOR update, only pixels corresponding to mask 9C will be displayed, as previously described. Therefore, it can be seen how the present invention masks regions 28 and 29 of triangle F, as shown in FIG. 9.

FIG. 8 is a representative computer graphics system including the hardware which may be used to implement the present invention. A surface description for the scene to be rendered is input into a central processing unit (CPU) 32 which controls and outputs the surface description in device coordinates to the triangle rendering hardware 30, which has been previously discussed. Mask plane 20 and frame buffer 22 are shown with the output of frame buffer 22 connected to a digital to analog converter (DAC) 34 which in turns outputs the signal to a display 36, such as a cathode ray tube (CRT), or the like. It should be noted that typical computer graphics systems include a mask plane 20 such that the present invention does not require any additional hardware. Mask plane 20 is normally included in a computer graphics system and used for a variety of rendering techniques which are independent of trimming operations such as processing polygons having concave or self intersecting edges. Additionally, the computer graphics system of the present invention, which is capable of performing trimming operations, typically includes at least four mask planes 20. Consequently, use of one these mask planes to trim surfaces will not impose any additional requirements on users of these systems.

Figure 10A:
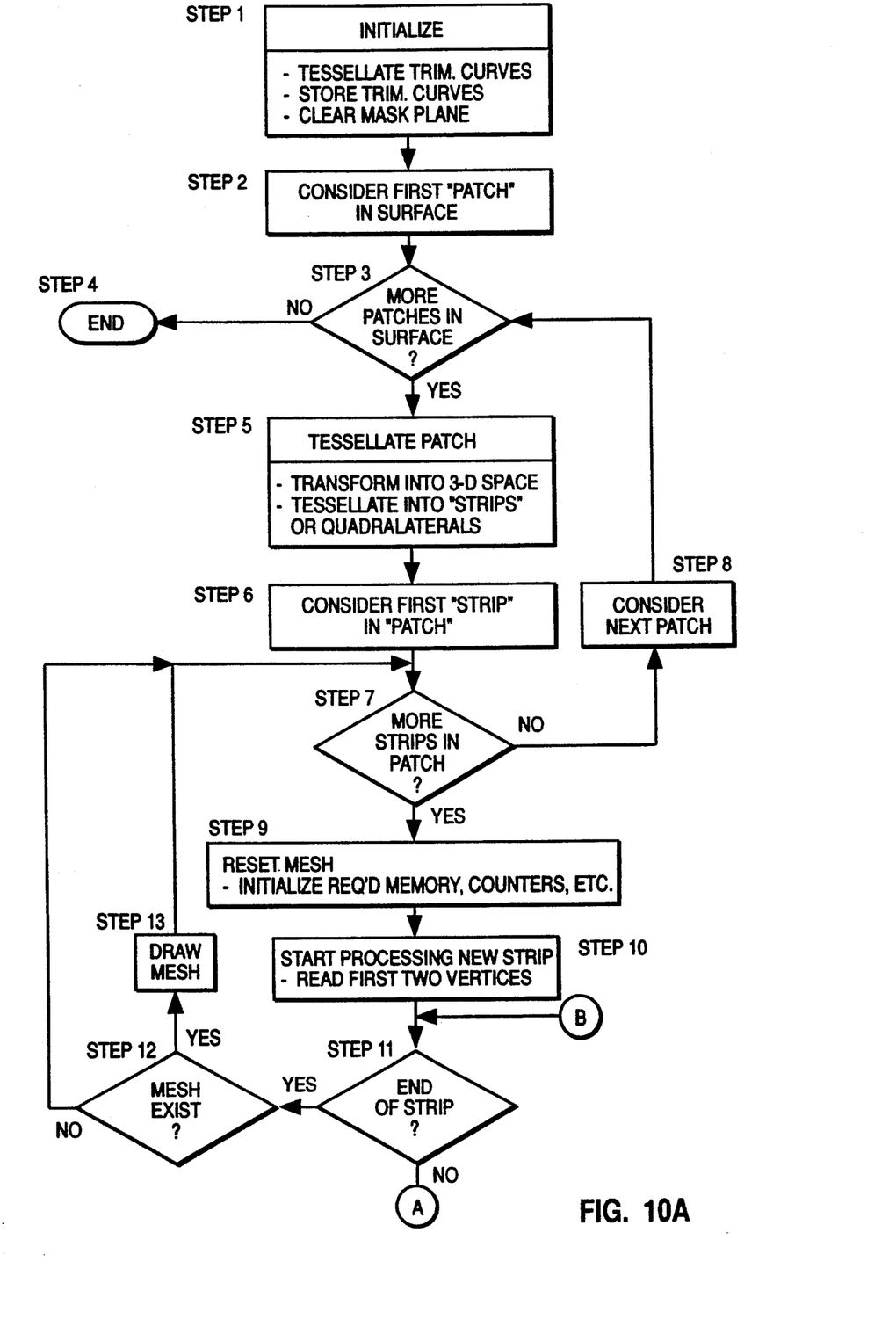
FIGS. 10A and 10B represent a flowchart illustrating the steps utilized by the present invention to display trimmed surfaces.
Figure 10B:
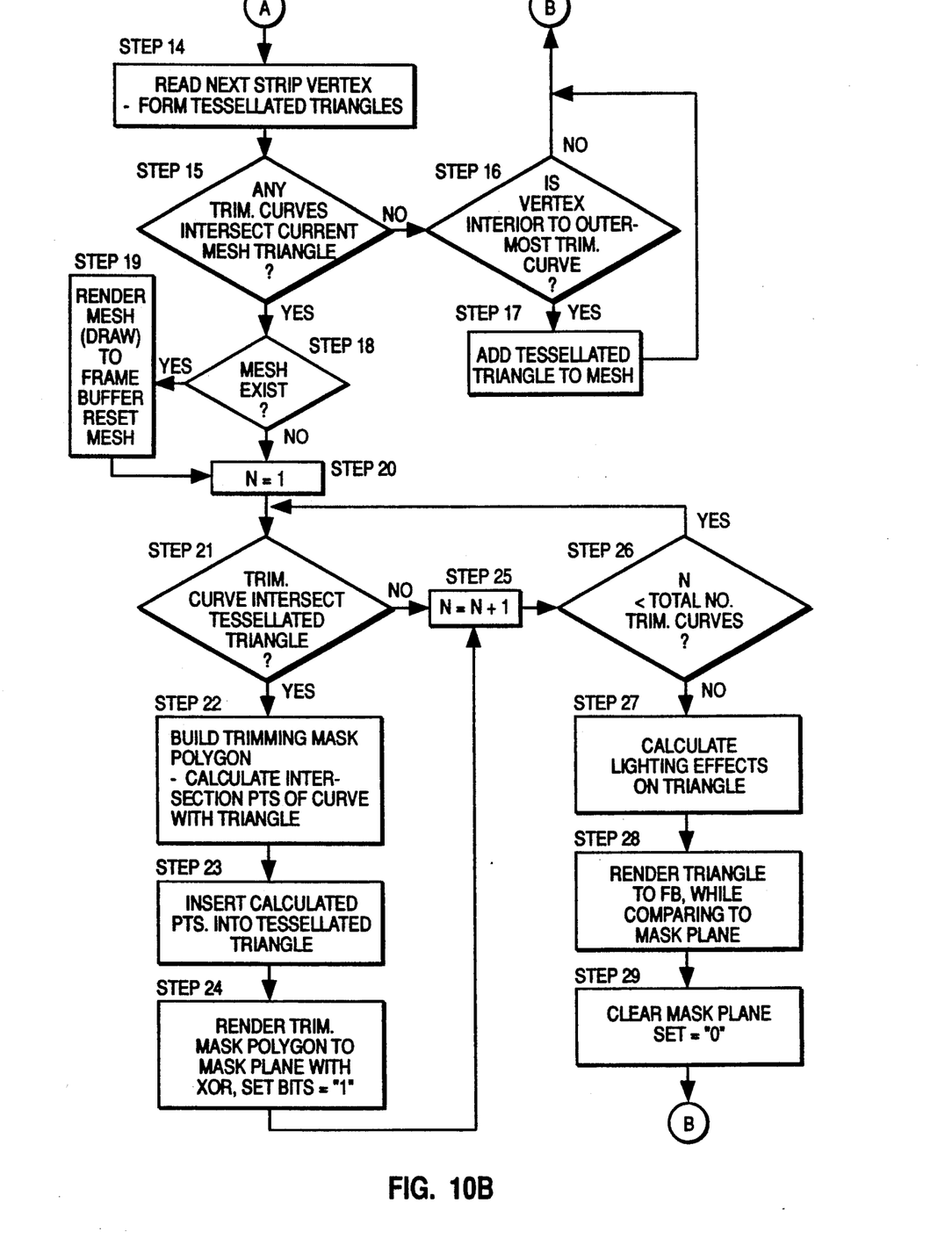

FIGS. 10A and 10B represent a flowchart which illustrates the process utilized by the present invention to implement trimming of surfaces. In particular, referring to FIG. 10A, step 1 initializes the system by calculating and tessellating all trimming curves for the scene to be displayed. Additionally, at step 1 the values representing the trimming curves are stored in memory and the mask plane 20 is cleared, i.e. set to logical 0. The present invention, at step 2, then considers the first patch to be processed. A patch represents a two-dimensional area in parametric coordinates (see FIGS. 1-3). At step 3 the present invention determines if there are additional patches remaining to be processed. It will be seen that step 3 is utilized by the present invention to end the process when the trimmed surface has been displayed. If there are no remaining patches in the trimmed surface to be displayed, then the process ends at step 4.

Next, step 5 tessellates the patch being processed. This includes computing the 3-D tessellation of the patch into quadrilaterals or strips (reference numeral 6, FIGS. 1-3). Step 6 then considers the first strip contained in the patch while step 7 determines whether there are strips in the patch remaining to be processed. Again, step 7 is utilized to end a processing loop contained in the flowchart of the present invention. If no strips are remaining to be processed then step 8 increments the method such that the next patch in the surface will be considered. The present invention then returns to step 3 which determines if there are patches remaining in the surface. If so, the subsequent patch is tessellated at step 5, and if no patches remain in the surface the method ends at step 4.

If it is determined at step 7 there are additional strips in the patch, then the present invention proceeds to step 9 which resets a mesh of tessellated triangles. Since this is an initial pass through the flowchart there have been no previously tessellated triangles. Therefore, step 9 merely initializes any required memory, counters or the like which are needed to maintain a mesh of tessellated triangles, as shown in FIGS. 1-3. After resetting the mesh, the present invention begins processing the next strip within the patch, under consideration, by reading the first two encountered vertices (step 10). Referring to FIG. 2, it can be seen that strip 6 includes triangle F which has vertices 12, 13, 14. For example, the present invention, at step 10 may initially read vertices 12 and 14 and maintain the coordinates of these vertices in memory. Step 10 essentially performs an initialization function by storing two vertices of a triangle which is being created in a strip. Therefore, with two vertices known it can be seen how reading a third vertex during subsequent steps within the process of the present invention will yield a triangle each time another vertex is read.

At step 11 it is determined whether the end of the strip has been reached, i.e. if the entire strip has been processed. If so, the present invention continues to step 12 which determines if a triangular mesh does exist and if so the mesh is drawn at step 13. If it is determined at step 12 that the mesh does not exist then the process returns to step 7 to determine if there are strips remaining in the patch to be processed. Subsequent to drawing the mesh in step 13 the present invention also returns to step 7 to process any strips remaining in the patch being considered.

Step 14 then begins reading the next vertex point within the strip being processed. As previously noted, each time a subsequent vertex is read, a new tessellated triangle will be formed. For example, referring to FIG. 2, if vertices 12 and 14 of strip 6 were read and stored by the present invention at step 10, then by reading vertex 13 at step 14 triangle F will be formed. Similarly, during subsequent iterations through the flowchart, triangle E is formed when vertex 16 is read and triangle D is formed by reading vertex 17. Therefore, it can be seen that by reading a single vertex a tessellated triangle will be formed. In this manner, a triangular mesh is built by the present invention.

Step 15 then determines if any trimming curves intersect the mesh triangle which is currently being considered. It can be seen in FIG. 2 that once vertex 13 is read at step 14, step 15 will then determine whether any trimming curves intersect the mesh triangle. In the case of triangle F, step 15 will determine that trimming curve 7 does intersect this triangle. If at step 15 it is determined that the mesh triangle does not intersect with a trimming curve then step 16 determines whether the vertex is interior to the outermost trimming curve. Step 16 ensures that the mesh triangle being considered is not outside of a trimming curve and included in that portion of the surface being trimmed. If this non-intersecting mesh triangle is interior to the trim curve then this triangle is added to the triangular mesh at step 17. Subsequent to step 17, and if the vertex is not interior to the trim curve (step 16), the process returns to step 11 to determine if the strip has been processed.

If at step 15 it was determined that the trimming curve intersects the mesh triangle currently being considered then step 18 determines if the mesh does in fact exist and if so, step 19 renders the mesh to the frame buffer. Steps 18 and 19 function to place any portion of the mesh which has previously been built into the frame buffer. Step 19 also resets the mesh in the same manner as previously discussed in conjunction with step 9. Subsequent to steps 18 and 19, step 20 sets a variable N equal to one. N is the number of trimming curves processed and will be subsequently used to count the number of trimming masks. Step 21 determines if a trimming curve intersects the tessellated triangle being considered. It should be noted that step 15 determines whether any of the trimming curves which were stored in step 1 intersect any triangle in the mesh and whether this triangle is interior to the outer most trimming curve (step 16). In this manner, it can be determined whether the triangle is part of the surface to be displayed or the surface to be trimmed. If at step 21 it is determined that a trimming curve intersects the tessellated triangle then step 22 builds a trimming mask, which is a polygon as previously discussed, by calculating the intersection points between the trimming curve and the original triangle (reference numerals 10, 11, FIG. 7). Step 23 then inserts these calculated points into the tessellated triangle and step 24 renders the trimming mask polygon into the mask plane by implementing an exclusive OR operation. This exclusive OR operation functions to set the bits within the mask plane which correspond to the trimming mask equal to a logical 1. Thus, it can be seen that a trimming mask is now resident in the mask plane (see FIG. 7). Step 25 then increments N, which is equal to the number of trimming curves, by setting N=N+1.

The present invention, at step 26, then determines whether N is less than the total number of trimming curves present. If N is less than the total of trimming curves then it can be seen that trimming curves remain to be processed. Therefore, the present invention returns to step 21 which once again determines if the trimming curves intersect the tessellated triangle, as previously discussed. If so, steps 22-25 are repeated. However, if the next trimming curve does not intersect the tessellated triangle, steps 22-24 are bypassed and the present invention continues to step 25 which increments N by a factor of 1. Step 26 then determines whether N is still less than the total number of curves. It can be seen that step 26 will return the process at step 21 until N is equal to the total number of trimming curves present. In this manner, the present invention ensures that each trimming curve is considered for each tessellated triangle being processed.

Once it is determined that N is not less than the total number of curves, then step 27 calculates the lighting effects on the tessellated triangle. Step 28 then renders the tessellated triangle to the frame buffer while comparing the trimming mask in the mask plane to the triangle such that only those bits which correspond to the mask (those that have been set equal to 1) are rendered into the frame buffer. Therefore, the polygon which is now rendered into the frame buffer is one that is capable of being processed by the rendering hardware. Thus, the present invention does not require that each individual vertex of the trimming curve be calculated, but allows lighting of the polygon by utilizing vertices which lie on the tessellated triangle, i.e. non-trimmed vertices and points along the edge. At step 29, the mask plane is then cleared (set to logical 0) since the surface with the trimmed portion deleted has already been rendered to the frame buffer. Subsequent to step 29 the present invention returns to step 11. It can be seen that once the last trimmed triangle has been processed at step 28, the mask plane is cleared at step 29. The method of the present invention ends because eventually the strip being processed will end at step 11, there will be no more strips in the patch to be processed at step 7 and no more patches in the surface to be processed at step 3, thereby causing the process to end at step 4.

To summarize, a preferred embodiment of the present invention which renders portions of a surface intersected by one or more trimming curves includes: (1) providing triangles forming a polygon between a vertex, or two vertices of the original tessellation triangle and successive vertices 8 of each trimming curve, to triangle rendering hardware 30; (2) updating mask plane 20, by triangle rendering hardware 30, using an exclusive OR operation; (3) sending the coordinates, color values and lighting intensities of the vertices of a tessellated triangle which forms the untrimmed polygon, and insertion vertices, to the triangle rendering hardware 30; (4) updating frame buffer 22 for pixels corresponding to bits in the mask plane 20 which are set to logical 1; and (5) resetting the bits of mask plane 20 to logical 0, after each untrimmed polygon is processed. In order to process triangles which are not intersected by trimming curves (triangles A-E, FIG. 3) the present invention provides for the coordinates, color values and light intensities of the vertices of the triangle to be sent from CPU 11 to triangle rendering hardware 30. The triangle rendering hardware then updates frame buffer 22 for all pixels interior to the triangle, i.e. the triangle is Gouraud shaded, and ignores mask plane 20.

Although certain preferred embodiments have been shown and described, it should be understood that many changes and modifications may be made therein without departing from the scope of the appended claims. A preferred embodiment of the present invention is implemented by modifying the microcode which is resident in a memory, such as a read only memory (ROM) on the graphics adapter card. However, any means for providing the functionality described herein, such as modifications to high level software or hard wired circuits, is contemplated by the present invention. For example, an array or table of values could be substituted for the mask plane, and a software algorithm could be used to emulate the rendering hardware.

What is claimed is:

1. A method of displaying, on a computer graphics system, a trimmed surface defined by a surface description and at least one trimming curve, said method comprising the steps of:

tessellating the surface to be trimmed into a plurality of polygons;

determining whether said at least one trimming curve intersects any of said polygons;

creating at least one mask, based upon the intersection of said at least one trimming curve with an intersected one of said polygons; and comparing said intersected polygon with said mask.

2. A method according to claim 1 wherein said method further comprises the step of providing a bitplane for storing said mask.

3. A method according to claim 2 wherein said step of creating comprises the step of performing an exclusive OR operation between said at least one mask.

4. A method according to claim 3 wherein said exclusive OR operation comprises the step of setting the bits of said bitplane which correspond to said mask to a logical 1.

5. A method according to claim 4 wherein said step of comparing comprises the step of determining whether a matched condition exists between the bits of said bitplane and the polygon.

6. A method according to claim 5 wherein said method of trimming further comprises the step of displaying only that portion of said polygon corresponding to bits stored within said bitplane which are set to a logical 1.

7. A method according to claim 6 wherein said method of trimming further comprises the step of setting each bit of said bitplane to a logical zero subsequent to the display of said polygon on said computer graphics system.

8. A method according to claim 7 wherein said step of tessellating comprises calculating the coordinates of points and surface normals for said points on the surface to be trimmed.

9. A method of displaying, on a computer graphics system, a trimmed surface defined by a surface description and at least one trimming curve, said method comprising the steps of:
   storing a description of said at least one trimming curve which defines the portion of the surface to be trimmed;
   tessellating the surface to be trimmed into a plurality of polygons;
   determining whether said at least one trimming curve intersects any of said polygons;
   creating at least one mask which corresponds to said intersected polygon less the portion to be trimmed;
   comparing said polygon with said mask; and
   displaying a portion of said polygon corresponding to said mask.

10. A system for displaying, on a computer graphics system, a trimmed surface defined by a surface description and at least one trimming curve, comprising:

means for tessellating the surface to be trimmed into a plurality of polygons;
   means for determining whether said at least one trimming curve intersects said polygons;
   means for creating at least one mask based upon the intersection of said at least one trimming curve with an intersected one of said polygons; and
   means for comparing said intersected polygon with said mask.

11. A system according to claim 10 wherein said system for trimming further comprises means for providing a bitplane for storing said mask.

12. A system according to claim 11 wherein said means for creating comprises means for performing an exclusive OR operation between said at least one mask.

13. A system according to claim 12 wherein said exclusive OR operation comprises setting the bits of said bitplane which correspond to said mask to a logical 1.

14. A system according to claim 13 wherein said means for comparing comprises means for determining whether a matched condition exists between the bits of said bitplane and the polygon.

15. A system according to claim 14 wherein said system for trimming further comprises means for displaying only that portion of said polygon corresponding to bits stored within said bitplane which are set to a logical 1.

16. A system according to claim 15 wherein said system for trimming further comprises means for setting each bit of said bitplane to a logical zero subsequent to the display of said polygon on said computer graphics system.

17. A system according to claim 16 wherein said means for tessellating comprises means for calculating the coordinates of points and surface normals for said points on the surface to be trimmed.

18. a system for displaying, on a computer graphics system, a trimmed surface defined by a surface description and at least one trimming curve, comprising:
   means for storing a description of said at least one trimming curve which defines the portion of the surface to be trimmed;
   means for tessellating the surface to be trimmed into a plurality of polygons;
   means for determining whether said at least one trimming curve intersects any of said polygons;
   means for creating a mask which corresponds to said intersected polygon less the portion to be trimmed;
   means for comparing said polygon with said mask; and
   means for displaying a portion of said polygon corresponding to said mask.

* * * * *